United States Patent [19]

Tomori

[11] 4,324,457
[45] Apr. 13, 1982

[54] MACRO PHOTOGRAPHIC CHANGE-OVER DEVICE FOR ZOOM LENS BARREL

[75] Inventor: Yasumasa Tomori, Sakado, Japan

[73] Assignee: Asahi Kogaku Kogyo Kabushiki Kaisha, Tokyo, Japan

[21] Appl. No.: 132,714

[22] Filed: Mar. 21, 1980

[30] Foreign Application Priority Data

Apr. 4, 1979 [JP] Japan .................. 54/40723

[51] Int. Cl.³ .................. G02B 7/10; G02B 15/18
[52] U.S. Cl. .................. 350/430
[58] Field of Search .................. 350/430, 429

[56] References Cited

U.S. PATENT DOCUMENTS

| | | | |
|---|---|---|---|
| 3,655,271 | 4/1972 | Suzuki | 350/430 |
| 3,731,987 | 5/1973 | Iida et al. | 350/430 |
| 3,841,735 | 10/1974 | Katagiri et al. | 350/430 |
| 3,969,018 | 7/1976 | Reinsch et al. | 350/430 |
| 4,162,822 | 7/1979 | Nonogaki | 350/429 |

Primary Examiner—Jon W. Henry
Attorney, Agent, or Firm—Sughrue, Mion, Zinn, Macpeak and Seas

[57] ABSTRACT

A zoom lens which may include two, three, or four lens groups. One of the lens groups is mounted in a focusing barrel and the others in moving barrels or a mount barrel. A zooming barrel is provided which is rotatable independently from the focusing barrel. A cam sleeve controls the movement of at least predetermined ones of the lens groups for zooming and close-up photographing while a guide ring operatively cooperates with the focusing barrel to provide a mechanical indication as to when a change-over is possible to the close-up photographing mode. A change-over sleeve cooperates with the zooming barrel for controlling the zooming operation. The focusing barrel, the cam sleeve, the guide sleeve and change-over sleeve cooperate with one another after changing to the close-up photographing mode such that the change-over sleeve is prevented from rotating except at one position thereof whereby rotation of the guide ring and focusing barrel are also prevented while simultaneously cooperation between the zooming barrel and change-over sleeve is released to enable the zooming barrel to rotate in the close-up photographing mode.

8 Claims, 13 Drawing Figures

MACRO PHOTOGRAPHIC CHANGE-OVER DEVICE FOR ZOOM LENS BARREL

BACKGROUND OF THE INVENTION

The present invention relates to a close-up change-over device for a two-hand type zoom lens in which a focusing and zooming operations may be independently carried out.

There have previously been known various constructions of lens barrels for two-hand type zoom lenses in which a close-up or macro photographing region is continuously provided with a rotational operation by a zooming operational ring. Typically, the close-up operation is provided as a continuation of the zooming operation without any change-over mechanism or the zooming operation ring is rotated toward a close-up photographing region by use of a change-over mechanism. Since in the above-described construction, the change-over operation to the close-up photographing region may be carried out irrespective of the rotational position of the zoom ring, two kinds of operational rings must be variously combined so as to obtain optimum photographic magnification. This is very troublesome in both its operation and construction.

SUMMARY OF THE INVENTION

According to the present invention, it is possible to change over to the close-up or macro photographing position only when the focusing ring and the zooming ring are positioned in defined rotational positions. After the change-over, when in the close-up photographing position, only the zoom ring may be rotated as the focusing ring is disabled.

According with the invention there is provided a zoom lens which includes a plurality of lens groups, a focusing barrel and a zooming barrel which are rotatable independently from one another, a cam sleeve for controlling movement of at least predetermined ones of the lens groups for zooming and close-up photographing modes, a guide ring operatively cooperating with the focusing barrel wherein information indicative of the fact that the change-over to the close-up photographing mode is possible is exchanged between the guide ring and the focusing barrel, and a change-over sleeve cooperating with the zooming barrel for controlling the zooming operation. The focusing barrel, the cam sleeve, the guide sleeve and change-over sleeve cooperate with one another such that after changing to the close-up photographing mode, the change-over sleeve is prevented from rotating whereby the rotation of the guide ring and focusing barrel are prevented. Simultaneously, cooperation between the zooming barrel and change-over sleeve is released to thereby enable the zooming barrel to rotate for the close-up photographing mode. As used herein, the term lens group means one or more lenses fixed in position relative to one another and which moves together.

DESCRIPTION OF THE PREFERRED EMBODIMENTS

Figure 8:
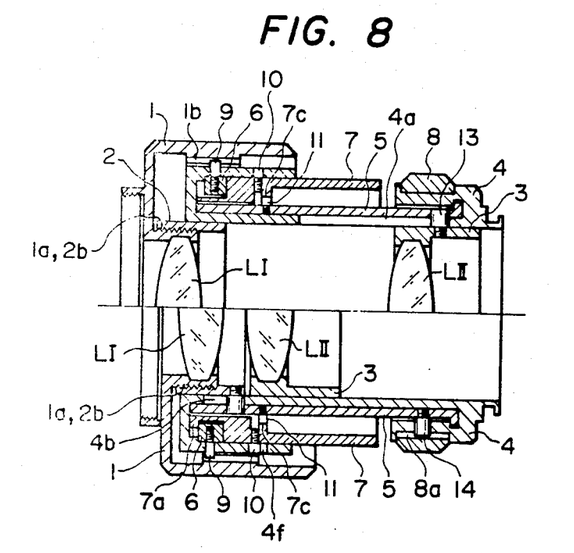
FIG. 8 is a cross-sectional view divided into two halves showing minimum and maximum zoom end positions of a second embodiment of a two lens group zoom lens optical system of the invention.
Figure 9:
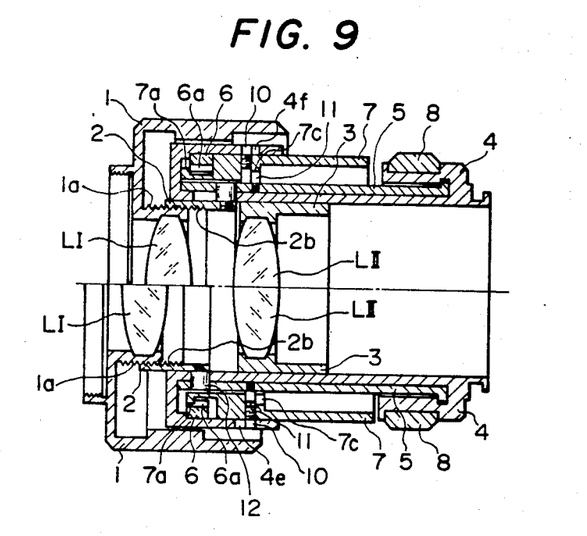
FIG. 9 is a cross-sectional view divided into two halves showing the lens system of FIG. 8 in a close-up mode at minimum and maximum focus distance positions.
Figure 10:
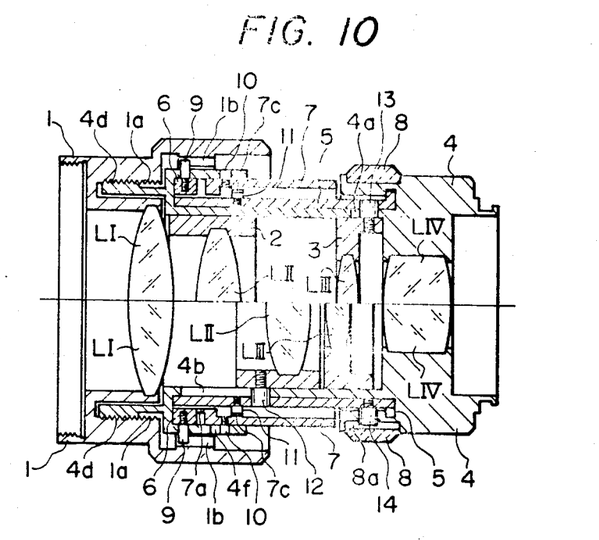
FIG. 10 is a cross-sectional view divided into two halves showing minimum and maximum zoom end positions of a third embodiment of a four lens group zoom lens optical system of the invention.
Figure 11:
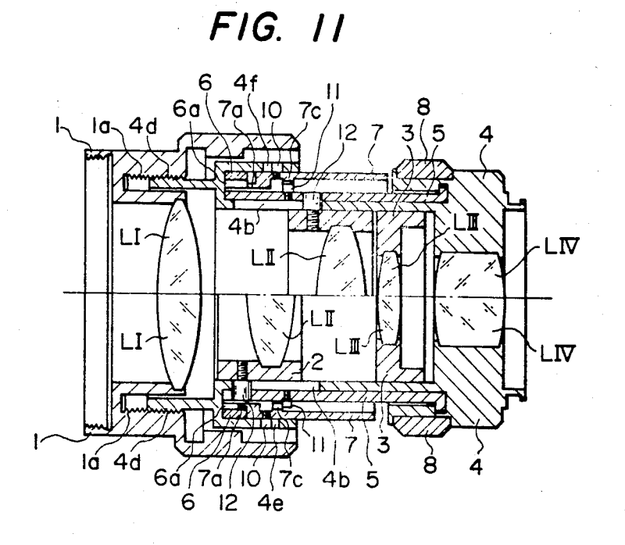
FIG. 11 is a cross-sectional view divided into two halves showing the lens system of FIG. 10 in a close-up mode at minimum and maximum focus distance positions.

The present invention will be hereinafter described with reference to the accompanying drawings. FIGS. 1 to 7 show a preferred embodiment of a zoom lens optical system including three lens groups. FIGS. 8 and 9 show a preferred embodiment of zoom lens optical system including two lens groups. FIGS. 10 and 11 show an embodiment of a zoom lens optical system including four lens groups.

The embodiment of a zoom lens optical system composed of three lens groups will now be described. This optical system includes a first lens group $L_I$, a second lens group $L_{II}$ and a third lens group $L_{III}$. The first lens group $L_I$ is moved integrally with the third lens group $L_{III}$ while the second lens group $L_{II}$ is moved relative thereto for the zooming operation. With respect to the focusing operation, only the first lens group $L_I$ is moved while the second and third lens groups $L_{II}$ $L_{III}$ remain stationary. For close-up or macro photographing, the zooming position is at the maximum focal length while at the same time the focusing position is set at a minimum photographing distance. Only the second lens group $L_{II}$ is moved in that case.

Figure 1:
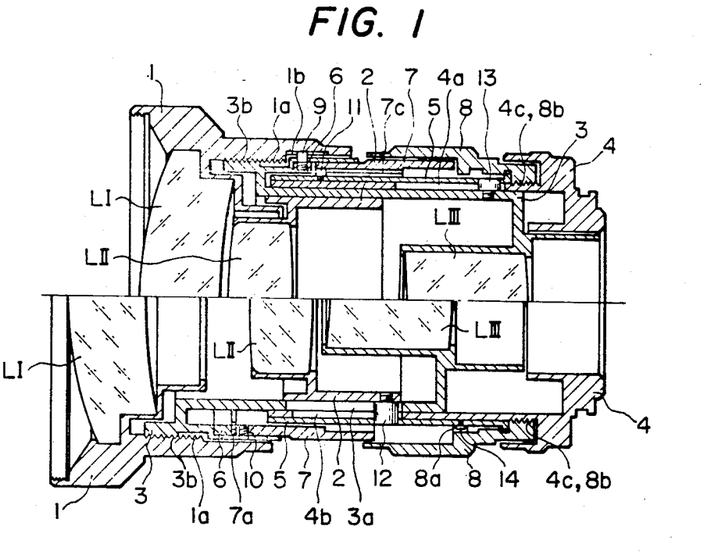
FIG. 1 is a cross-sectional view divided into two halves showing minimum and maximum zoom end positions of a first embodiment of a three lens group zoom lens optical system of the invention.

The upper half of FIG. 1 shows a cross-sectional side view of a zoom lens of the invention set at the infinite distance focusing position and in a position in which the zooming position is at a minimum focal length. The lower half of FIG. 1 shows a cross-sectional side view in which the zooming position is at the maximum focal length. The upper half of FIG. 2 shows the lens in a cross-sectional view at the maximum focal length for zooming and at the minimum focusing distance while the lower half of FIG. 2 shows a cross-sectional side view in the close-up or macro photographing position.

Figure 2:
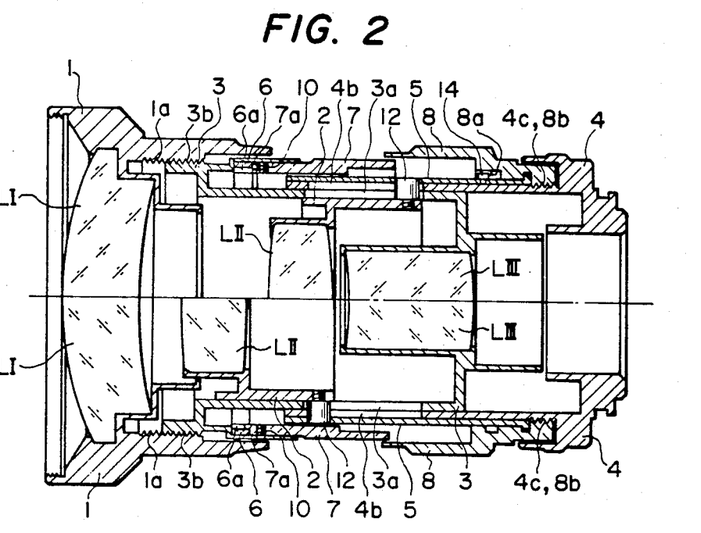
FIG. 2 is a cross-sectional view divided into two halves showing the lens system of FIG. 1 in a close-up mode at minimum and maximum focus distance positions.
Figure 3:
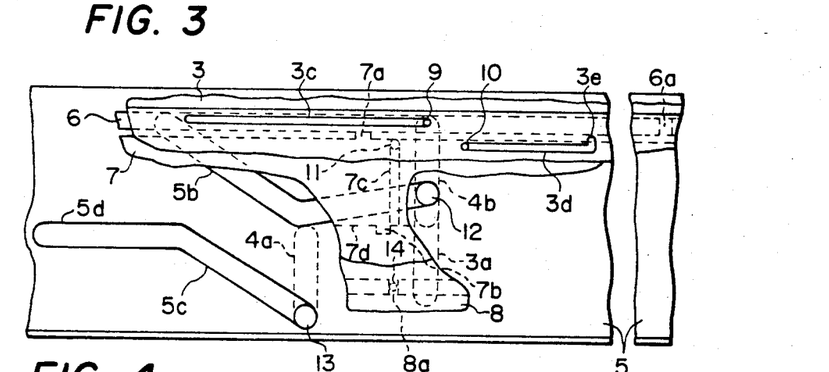
FIGS. 3 to 7 are exploded side views showing primary operating components of the embodiment of FIGS. 1 and 2.
Figure 4:
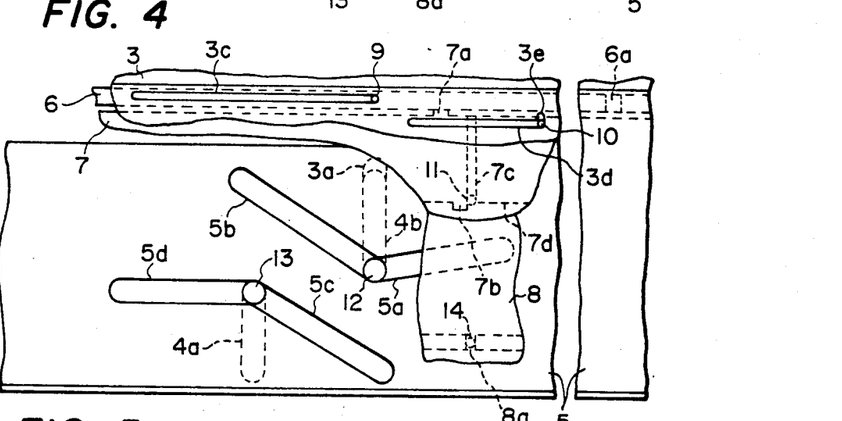

In FIGS. 1 and 2 reference numeral 1 designates a focusing ring or barrel supporting the first lens group $L_I$ and having therein a helicoid screw thread 1a which is used in the focusing operation and a guide groove 1b for transmission of angular movement during the focusing operation. Reference numeral 2 designates a first moving sleeve or barrel which supports the second lens group $L_{II}$ and to which a pin 12 for transmitting the movement of the second lens group is connected. Reference numeral 3 designates a second moving sleeve or barrel which supports the third lens group $L_{III}$ and which has a helicoid screw thread 3b meshing with the above-described helicoid screw thread 1a. A second guide pin 13 for transmitting the movement of the first and third lens groups $L_I$ and $L_{III}$ is rigidly coupled to the second moving barrel 3. The second moving barrel 3 slidingly supports the first moving barrel 2.

Referring back to FIGS. 1 and 2, reference numeral 4 designates a mount barrel provided with a mount portion for attachment to or detachment from a camera body (not shown). Mount barrel 4 supports the second moving barrel 3 slidably therein and has a guide groove 4a therein in which the above-described guide pin 13 is inserted prevent rotational movement of the second moving barrel 3 around the optical axis and at the same time guides the second moving barrel 3 in the direction of the optical axis. Also, in the mount barrel 4 is provided a guide groove 4b in which the above-described guide pin 12 moves and which is operated in the same manner as the above-described guide groove 4a. As shown in FIGS. 3 to 7, in the second moving barrel 3 is provided a guide groove 3a in circumferential alignment with groove 4b into which the above-described guide pin 12 is inserted to prevent rotational movement of the first moving barrel 2 about the optical axis while at the same time guiding the movement thereof in the direction of the optical axis. A guide groove 3c defines the range of focusing while guide grooves 3d and 3e define the zooming range. Reference numeral 5 denotes a cam sleeve which is slidingly supported by the mount barrel 4 and to which a guide pin 11 which transmits its rotational movement and a guide pin 14 which receives rotational movement are rigidly coupled. Zooming grooves 5a and 5c for imparting relative movements to the respective lens groups for zooming and macro grooves 5b and 5d for imparting relative movements to the respective lens groups for close-up photographing are formed in the cam barrel 5 as shown in FIGS. 3 to 7. Reference numeral 6 designates a guide ring which is slidingly supported by the second moving barrel 3 and to which a guide pin 9 slidingly disposed in the above-described guide grooves 1b and 3c is rigidly affixed. A change-over groove 6a, the position of which varies in accordance with the focusing position, is formed in the guide ring 6 for determining when change-over is possible from the close-up photographing position.

Reference numeral 7 denotes a change-over sleeve which is slidingly supported by the second moving barrel and to which a guide pin 10 slidingly disposed in the above described guide grooves 3d and 3e is rigidly coupled. In the change-over sleeve 7 are formed a guide groove 7c to which the angular movement of the cam ring 5 is transmitted through the guide pin 11. Also, provided in the change-over sleeve 7 are a projection 7a which produces an indication for enabling change-over from the zoom position to the close-up photographing position and a projection 7b which indicates the position where change-over from the close-up photographing position to the normal zooming position is possible.

In the preferred embodiment shown, the close-up photographing change-over position at the minimum focusing distance is at the maximum focal length of the zooming position. Therefore, the angular relationship of the above-described guide groove 6a and the projection 7a corresponds to the state at which the focusing sleeve 1 is rotated to the minimum focusing distance photographing position and the zooming sleeve 8 is rotated to the maximum focal length position.

The zooming and close-up operations are both controlled via a zooming sleeve 8 in which a guide groove 8a for defining the movement of the cam sleeve 5 in the direction of the optical axis is formed. The guide groove 8a is defined by a gap or notch formed in a radially inwardly directed annular rib on the sleeve 8. The guide pin 14 coupled to the cam sleeve 5 is slidingly engaged in the guide groove 8a. With this construction, the zooming sleeve 8 is rotated integrally with the cam sleeve 5. The zooming sleeve 8 is coaxially supported by engagement of a screw thread 8b thereof with a screw thread 4c of the mount barrel 4.

Figure 12:
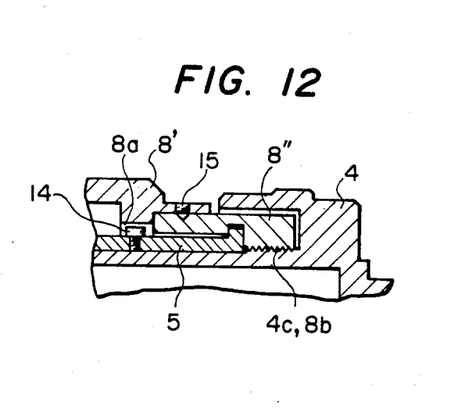
FIGS. 12 and 13 are cross-sectional views showing modifications of a cam sleeve member used with the preferred embodiments of the invention.
Figure 13:
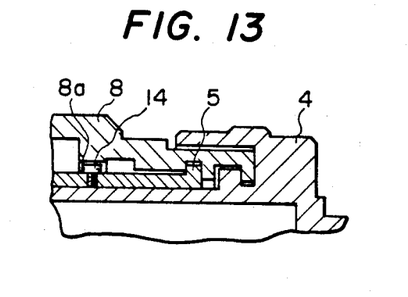

An alternate construction may be used in which the zooming sleeve 8 is supported by the mount barrel 4 in which the zooming sleeve 8, as shown in FIG. 13, is rotatable freely around the optical axis without any movement thereof in the direction of the optical axis. Moreover, if the movement of the cam sleeve 5 and zooming barrel 8 in the direction of the optical axis are defined or controlled and both members are rotatably supported freely by the screw threads 4c and 8b, the following effects are obtained. In this construction, the zooming barrel 8 is divided into a zooming operational barrel 8' having a guide groove 8a and a ring member 8" having a threaded groove 8b, the ring member 8" being formed to define the movement of the cam sleeve 5 in the direction of the optical axis. The zooming operational barrel 8' and the ring member 8" are, as shown in FIG. 12 integrally coupled by a set screw 15. When the ring member 8" having the thread 8b is uncoupled from the barrel 8' and the barrel is held stationary, the ring member 8" can be moved to the infinite distance focusing position without rotation of the cam sleeve 5 and the cam sleeve 5 will move in the direction of the optical axis by action of the threads 4c and 8b and the lens groups $L_I$, $L_{II}$ and $L_{III}$ will move back and forth without variation of the spaces between the lenses. Accordingly, the focusing position may be varied so as to perform a co-called rear adjustment. With the guide groove 8a of the above-described zooming operational barrel 8' cooperating with the guide pin 14 coupled to the cam ring 5 and the zooming operational barrel 8' and the ring member integrally coupled by the set screw 15 after the rear adjustment, the cam sleeve 5 and the divided ring members 8' and 8" will rotate integrally. In the preferred embodiment, the definition of the path of movement of the cam sleeve 5 in the direction of the optical axis is achieved through the zooming barrel 8 with the mount barrel 4. Still further, a modification may be employed in which the cam sleeve 5 is moved directly by the mount barrel 4 thereby defining the axial movement thereof.

With the above-mentioned construction, the zooming barrel 8 can be rotated from its position corresponding to the minimum focal length position for zooming and infinite focusing distance, that is, the state shown in the upper half of FIG. 1, to the maximum focal length position, that is, the state shown in the lower half of FIG. 1. Upon rotation, the cam barrel 5 is moved (rotated) from the left side to the right side in FIG. 3 which is an exploded plan view corresponding to the upper half portion of FIG. 1. When the cam sleeve 5 rotates, the guide pin 12 which is engaged with the zooming groove 5a and guide grooves 3a and 4b moves downward from the position shown in FIG. 3 to the position shown in FIG. 4 which corresponds to the lower half of FIG. 1. Simultaneously, the first moving barrel 2 and the second lens group $L_{II}$ moves from left to right in the upper half of FIG. 1 to the position shown in the lower half of FIG. 1. Also, the guidepin 13, which is engaged with the above-described zooming groove 5c guide groove 4a, moves upward from the position illustrated in FIG. 3 to the position shown in FIG. 4 while the second moving barrel 3, the first lens group $L_I$ and the third lens group $L_{III}$ move from the right to the left in the upper half of FIG. 1 to the position shown in the lower half of FIG. 1. Since the guide pin 11 rigidly coupled to the cam sleeve 5 is engaged with the guide groove 7c formed in the change-over sleeve 7, rotation of the cam sleeve 5 is transmitted directly to the change-over sleeve 7 and the guide pin 10 slidingly disposed in the above-described guide groove 3d and the projections 7a and 7b are moved from the left to the right in FIG. 3 up to the position shown in FIG. 4. Also, the change-over sleeve 7 is rotated around and moved in the optical axis direction in the same manner as the second moving barrel 3 from the position shown in the upper section of FIG. 1 to the position of the lower half of FIG. 1 while the guide groove 7c moves along the guide pin 11 upward from the position of FIG. 3 to the position shown in FIG. 4.

Next, when the focusing barrel 1 is rotated from the position corresponding to infinite focal distance and maximum focal length as shown in the lower half of FIG. 1 to the minimum focal distance position, the focusing barrel 1 and the first lens group $L_I$ are moved from the right to the left in the lower half of FIG. 1 to the position shown in the upper half of FIG. 2 by the helicoid screw threads 1a and 3b. Upon rotation of the focusing barrel 1, the guide pin 9 slidingly disposed in the guide groove 1b and the change-over groove 6a move from the right to the left in FIG. 4 to the position shown in FIG. 5 whereupon the change-over groove 6a confronts the projection 7a. In this position, it is possible to make the change-over to the close-up photographing mode at the minimum focal distance and the maximum focal length for zooming.

To execute the change-over to the close-up photographing mode, the change-over sleeve 7 is manually moved from the right to the left in the upper half of FIG. 2 at the minimum focal distance position and at the maximum focal length for zooming. That is, it is moved upward to the position shown in FIG. 5 which corresponds to the upper half of FIG. 2. By this operation, the projection 7a becomes engaged with the change-over groove 6a and the guide pin 11 disengages from the guide groove 7c and the guide pin 10 engages in the guide groove 3e.

Figure 6:
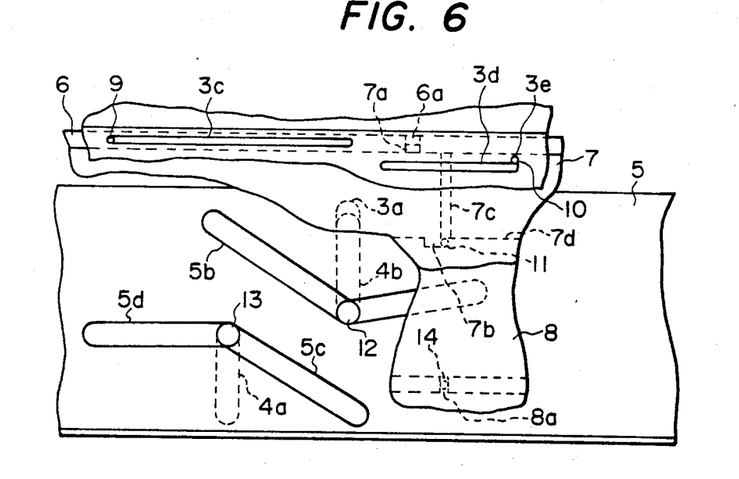

FIG. 6 shows the positions of the various members immediately after change-over to the close-up photographing mode. Since the guide pin 10 is engaged with the guide groove 3e formed in the second moving barrel 3 which does not move along the optical axis under this condition, rotation of the change-over ring 7 is prevented. Also, since the projection 7a is engaged with the change-over groove 6a, the guide ring 6 is also prevented from rotating. Accordingly, the rotation of the focusing barrel 1 is prevented. Moreover, upon the disengagement of the guide pin 11 from the groove 7c, the cam ring 5 is prevented from rotating from the right to the left in FIG. 6 by the projection 7b but can be rotated from the left to the right. Thus, the zooming barrel 8 can be rotated freely in the close-up mode.

Figure 7:
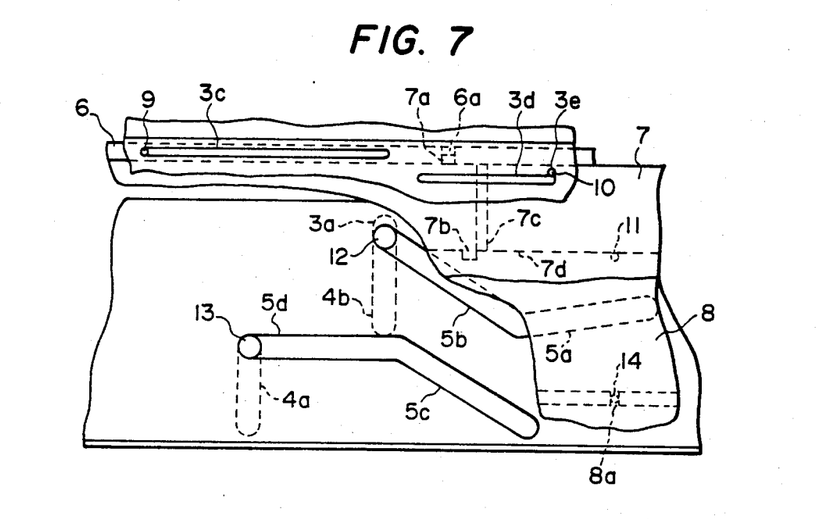

FIG. 7 illustrates the position where the zooming barrel 8 has been further rotated from the position shown in FIG. 6, from the left to the right in the figure. In changing from the positions from FIG. 6 to FIG. 7, when the zooming barrel 8 is moved from the left to the right in FIG. 6, upon engagement of the guide pin 14 and the guide groove 8a, the cam sleeve 5 moves from the left to the right in the same manner, the guide pin 11 moves along the upright surface 7d perpendicular to the optical axis to thereby prevent the change-over sleeve 7 from moving downward from the position of FIG. 7 and engagement between the change-over groove 6a and the projection 7a is maintained. Thus, except for precisely at the close-up change-over position, the change-over operation of the change-over sleeve 7 is prevented in the close-up mode. Also, the guide pin 12 is moved upward from the position of FIG. 6 by the macro grooves 5b, guide grooves 3a and 4b, which is a position in abutment with the end of the guide groove 4b to the position shown in FIG. 7 which is an exploded view of the primary parts at the minimum focal distance for macro photographing. Simultaneously, the first moving barrel 2 and the second moving lens group move from the right to the left in the upper half of FIG. 2 which corresponds to the minimum focal distance for macro photographing.

Further, the guide pin 13 is stopped in the position shown in FIG. 6 by the macro groove 5d and the guide groove 4a. In the case where the movement of cam sleeve 5 and the zooming barrel 8 in the direction of the optical axis is defined by the screw threads 4c and 8b as in the preferred embodiment shown in FIGS. 1 and 2, the macro groove 5d must be formed as a lead groove to offset the lead of the screw. However, if the cam sleeve 5 and the zooming barrel 8 are so constructed as to not move in the direction of the optical axis, the macro groove 5d may be formed as a horizontal straight groove in FIGS. 3 to 7. Due to the fact that the guide pin 13 does not move from its position shown in FIG. 6 to the position shown in FIG. 7 in the direction of the optical axis, the second moving barrel 3, the first lens group $L_I$ and the third lens group $L_{III}$ do not move while the zoom lens continuously moves from the position of the upper half to that of the lower half of FIG. 2 for close-up photographing.

Figure 5:
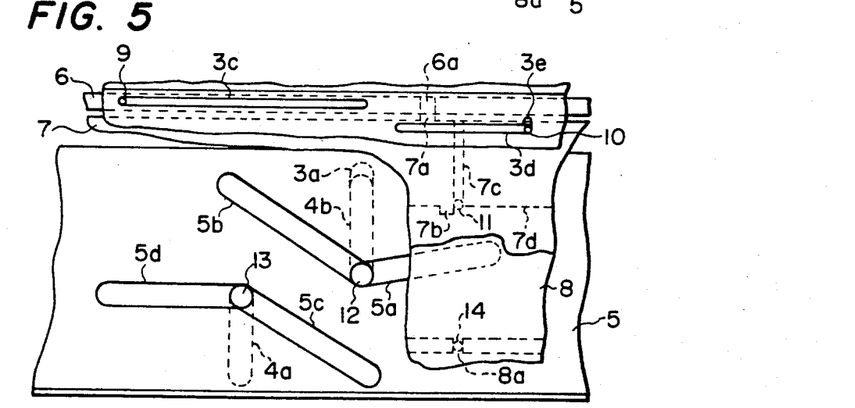

In order to release the lens from the close-up photographing mode, the zooming barrel 8 is moved from the right to the left in FIG. 7. At the same time, the cam sleeve 5 moves in the same direction and the guide pin 11 comes into abutment with the projection 7b as shown in FIG. 6. In the position shown in FIG. 6, the change-over sleeve 7 moves downwardly thereby releasing the projection 7a from the change-over groove 6a and disengaging the guide pin 10 from the guide groove 7c as shown in FIG. 5. At this point the macro photographing position has been released.

Another embodiment of a zoom lens optical system composed of two lens groups will be described with reference to FIGS. 8 and 9 in which like reference numbers denote like members as in the previously-described embodiment of a three lens group zoom lens optical system.

In this embodiment of the zoom lens optical system, zooming is achieved by moving the first lens group $L_I$ relative the second lens group $L_{II}$ and focusing is achieved by maintaining the second lens group in a fixed position while moving the first lens group. Close-up photographing is carried out by maintaining the zooming position at the position of maximum focal length and the focusing position at the minimum focal distance while holding the second lens group in a fixed position $L_{II}$ and moving the first lens group $L_I$. The optical system thus constructed is shown in FIGS. 8 and 9.

The minimum zoom focal length position is illustrated in the upper half of FIG. 8 and the maximum zoom focal length position is illustrated in the lower half of the figure. Both positions correspond to the infinite focusing distance position. FIG. 9 shows the maximum zoom focal length position in its upper half and the close-up photographing position in its lower half both of which are shown at the minimum focusing distance position.

The primary distinctions of this embodiment from that described previously in which three lens groups are employed are that the focusing barrel 1 supporting the first lens group $L_I$ is threadedly supported on the first moving barrel 2 by helicoid screw threads 1a and 2b, the first moving barrel 2 is slidably supported directly on the mount barrel 4, and the guide ring 6 and the change-over sleeve 7 are coaxially supported on the mount barrel 4. Grooves guiding guide pins 9 and 10 are formed in the mount barrel 4. (In the earlier described embodiment of a zoom lens optical system composed of three lens groups, such guide grooves are formed in the second moving barrel 3.) In operation, the operational direction of the change-over sleeve 7 in changing over to the close-up photographing position is reversed. That is, the change-over sleeve 7 moves from the left to the right. However, any operational direction may be used.

With this construction, in the same manner as for the zoom lens optical system formed of three lens groups, when the zooming barrel 8 is rotated from the infinite distance focusing and the minimum focal length zoom position, the cam sleeve 5 rotates together therewith, the first lens group $L_I$ moves from the left to the right in the figure by the zooming groove formed in the cam sleeve 5, and the second lens group $L_{II}$ moves from the right to the left until it reaches the position shown in the lower half of FIG. 8. From this position, the focusing barrel 1 may be rotated and accordingly the first lens group $L_I$ moves from the right to the left in the figure, with the second lens group held fixed, to the minimum distance focusing position shown in the upper half of FIG. 9. At this point, the change-over groove 6a formed in the guide ring 6 confronts the projection 7a formed in the change-over sleeve 7. When the change-over sleeve 7 is moved from the left to the right in the figures, the projection 7a falls into the change-over groove 6a and the guide pin 10 moves from a guide groove 4e to a guide groove 4f which corresponds to the guide grooves 3d and 3e of the previously described three lens group embodiment. Also, rotation of the change-over sleeve 7 is prevented as are rotation of the guide ring 6 and focusing barrel 1. Further, the guide pin 11 disengages from the guide groove 7c thereby enabling the cam sleeve 5 to rotate for the close-up photographing operation. Therefore, when the zooming barrel 8 is rotated from this position to the close-up position, while the second lens group $L_{II}$ is stopped by the macro groove formed in the cam sleeve 5, the first lens group $L_I$ moves from the right to the left in the figure until it reaches the position shown in the lower half of FIG. 9 which corresponds to the minimum close-up photographing distance position. To release the lens from the close-up photographing position, the operational direction of the change-over sleeve is reversed. The other operations of this embodiment are the same as for the zoom lens optical system formed of three lens groups.

FIGS. 10 and 11 show an embodiment of a zoom lens optical system including four lens groups. In this embodiment, the zooming operation is carried out by maintaining first and fourth lens groups $L_I$ and $L_{IV}$ at constant positions and moving second and third lens groups $L_{II}$ and $L_{III}$ relative to one another. The focusing operation is carried out by moving only the first lens group while close-up photographing is carried out by moving only the second lens group $L_{II}$ at the minimum focusing photographing distance and at the maximum focal length of zooming. In the figures, like reference numerals are used to designate like members as in the zoom lens optical system composed of three lens groups. In the upper half of FIG. 10 is shown the minimum focal length zoom position while the maximum focal length zoom position is shown in lower half of the figure, both at the infinite distance focusing position. FIG. 11 illustrates in the upper half thereof the maximum focal length zoom position and the close-up photographing position in the lower half, both at the minimum photographing distance focusing position. The following points are different from those of the first described zoom lens optical system composed of three lens groups. The focusing barrel 1 is supported on the mount barrel 4 by threaded engagement between the helicoid screw threads 1a and 4d, the first moving barrel 2 is slidingly supported directly on the mount barrel 4, and the guide ring 6 and the change-over sleeve 7 are supported on the mount barrel 4.

With this construction, in the same manner as for the first described zoom lens optical system composed of three lens groups, from the position shown in the upper half of FIG. 10 at the infinite focusing distance and minimum focal length zoom end, by rotating the zoom barrel 8, the cam sleeve 5 is rotated together therewith by the zooming groove formed in the cam sleeve 5. During this time, the first lens group $L_I$ and the fourth lens group $L_{IV}$ are maintained at constant positions, the second lens group $L_{II}$ moves from the left to the right in the figure and the third lens group $L_{III}$ moves from the right to the left in the figure until it reaches the position shown in the lower half of FIG. 10. When, under this condition, the focusing barrel 1 is rotated to the minimum photographing focusing distance position, the change-over groove 6a formed in the guide ring 6 comes into abutment with the position is shown in the upper half of FIG. 11. Then, when the change-over sleeve 7 is moved from the right to the left in the figure, the change-over groove 6a receives the projection 7a and the guide pin 10 is engaged from a guide groove 4e to a guide groove 4f. The guide grooves 4c and 4f correspond to the grooves 3d and 3e of the first described three lens group system. At this point, rotation of the change-over sleeve 7 is prevented as is rotation of the guide ring 6 and the focusing barrel 1. At the same time, the guide pin 11 disengages from the guide groove 7c enabling the cam sleeve to rotate to the close-up photographing region. Further, when the zooming barrel 8 is rotated from this position to the close-up photographing region by rotation of the cam sleeve 5, only the second lens group $L_{II}$ moves from the right to the left in the figure along the macro groove formed in the cam sleeve 5 thereby enabling close-up photographing. In the lower half of FIG. 11 is shown the minimum distance close-up photographing position. Release of the lens system from the close-up operational position is achieved by the same operation as that used with the first described three lens group system.

As mentioned above in more detail, according to the present invention, the movements of the lens group are controlled by the cam sleeve 5, the change-over sleeve 7 which conveys the rotational position of the cam sleeve 5 and the guide ring 6 which conveys the rotational position of the focusing barrel 1. Rotation of the focusing barrel 1 after change-over to the close-up mode is impossible and the rotational limits for the zooming barrel 8 are changed from the zooming region to the close-up photographing region. Accordingly, it is possible to provide a scale (not shown) for close-up photographing in addition to a zooming scale (not shown) on the zooming barrel 8 for assisting in the photographing operation. Further, when the zooming barrel 8 is positioned in the close-up photographing region, the change-over sleeve 7 cannot be moved beyond the close-up photographing region and, since the focusing barrel 1 cannot then be rotated, operational errors are minimized or eliminated.

In the specific embodiments described, a zoom lens optical system is disclosed in which change-over to the close-up mode is possible at the minimum focusing distance position and at the maximum focal length zoom position. However, since the exchange of the change-over information for the close-up mode is carried out through the guide ring 6 in cooperation with the focusing barrel 1 and the change-over sleeve 7 in cooperation with the cam sleeve 5, proper operation in this mode is set by the relationship between the change-over groove 6a and the projection 7a. It is of course possible to apply the teachings of the invention to any zoom lens optical system which includes a provision for a close-up photographing mode.

What is claimed is:

1. A zoom lens comprising: a plurality of lens groups; a focusing barrel and a zooming barrel rotatable independently from one another; a cam sleeve for controlling movement of at least predetermined ones of said lens groups for zooming and close-up photographing; a guide ring operatively cooperating with said focusing barrel wherein information of only one rotational position indicative that change-over to a close-up photographing mode is possible is exchanged between said guide ring and said focusing barrel; and a change-over sleeve cooperating with said zooming barrel for zooming; said focusing barrel, said cam sleeve, said guide sleeve and said change-over sleeve cooperating such that after changing to said close-up photographing mode said change-over sleeve is prevented from rotating whereby the rotation of said guide ring and rotation of said focusing barrel are prevented while simultaneously cooperation between said zooming barrel and said change-over sleeve is released to thereby enable said zooming barrel to rotate for said close-up photographing mode.

2. The zoom lens of claim 1 wherein when said zooming barrel is positioned in a close-up photographing position except for a position where change-over is possible, axial movement of said change-over sleeve is prevented by means on said cam sleeve being in abutment with an upright surface on said change-over sleeve perpendicular to the optical axis of said lens.

3. The lens of claim 1 further comprising a zooming operational ring rotatable with said cam sleeve; a mount barrel; and a ring threadably supported on said mount barrel for defining movement of said cam sleeve in a direction parallel to said optical axis and coupled integrally to said zooming operational ring.

4. A zoom lens comprising: first, second and third lens groups; a focusing barrel supporting said first lens group and having a helicoid screw thread formed on an inner portion thereof and a first guide groove for transmitting angular movement of said focusing barrel during rotation thereof; a first moving barrel supporting said second lens group and having a first guide pin rigidly coupled thereto for transmitting movement of said second lens group; a second moving barrel supporting said third lens group and slidingly supporting said first moving barrel and having a helicoid screw thread meshing with said helicoid screw thread of said focusing barrel, a second guide pin rigidly connected thereto for transmitting movement of said first and third lens groups, a second guide groove extending parallel to said optical axis and into which is disposed said first guide pin for preventing rotational movement of said first moving barrel about said optical axis, a third guide groove extending perpendicular to said optical axis for defining the range of focusing for said lens and fourth and fifth guide grooves for defining the zooming range of said lens, said fourth guide groove extending perpendicular to said optical axis and said fifth guide groove extending from an end portion of said fourth guide groove parallel to said optical axis, and said fifth guide groove being substantially shorter than said fourth guide groove; a mount barrel having a mount portion for attaching said zoom lens to a camera body, said mount barrel slidably supporting said second moving barrel, said mount barrel having a sixth guide groove extending parallel to said optical axis, said second guide pin being slidingly disposed in said sixth guide groove, said sixth guide groove preventing rotational movement of said second moving barrel around said optical axis and for guiding said second moving barrel in the direction of said optical axis, a seventh guide groove extending parallel to said optical axis, said first guide pin being slidably disposed in said seventh guide groove and said mount barrel having a screw thread; a cam sleeve slidingly supported by said mount barrel and having third and fourth guide pins rigidly coupled thereto, said cam sleeve having eighth through eleventh guide grooves formed therein, said eighth and ninth guide grooves imparting relative movement to said second and third lens groups, respectively, during zooming operations and said tenth and eleventh guide grooves imparting relative movement to said second and third lens groups, respectively, for close-up photographing operations, said eighth and tenth guide grooves being joined at end portions thereof, said eighth guide groove extending forwardly from its juncture with said tenth guide groove at a first predetermined angle with respect to said optical axis and said tenth guide groove extending forwardly from said juncture at a second predetermined angle with respect to said optical axis, said ninth and eleventh guide grooves being joined at end portions thereof, said ninth guide groove extending rearwardly of its juncture with said eleventh guide groove, and said eleventh guide being substantially perpendicular to said optical axis, said first guide pin being slidingly disposed to move along said eighth and tenth guide grooves and said second guide pin being slidingly disposed to move along said ninth and eleventh guide grooves; a guide ring slidingly supported by said second moving barrel and having a fifth guide pin rigidly coupled thereto and slidingly disposed in said first guide groove and in said third guide groove and said guide ring having a change-over groove formed at a position for conveying information as to when a change-over is possible for a change to a close-up photographing mode; a change-over sleeve slidingly supported by said second moving barrel and having a sixth guide pin fixedly coupled thereto and slidingly disposed to move in said fourth and fifth guide grooves, a twelfth guide groove extending parallel to said optical axis in which is slidingly disposed said third guide pin, first and second projections extending from said change-over sleeve, said first projection producing an indication for enabling said change-over from a zoom mode to said close-up mode and said second projection being disposed so as to indicate a position at which change-over from said close-up mode to said zooming mode is possible; a zooming sleeve having a thirteenth guide groove extending perpendicular to said optical axis with said fourth guide pin slidingly disposed therein wherein said zooming sleeve is rotatable integrally with said cam sleeve and said zooming sleeve having a screw thread engaged with said screw thread of said mount barrel.

5. A zoom lens comprising: first, second and third lens groups; a focusing barrel supporting said first lens group and having a helicoid screw thread formed on an inner portion thereof and a first guide groove for transmitting angular movement of said focusing barrel during rotation thereof; a first moving barrel supporting said second lens group and having a first guide pin rigidly coupled thereto for transmitting movement of said second lens group; a second moving barrel supporting said third lens group and slidingly supporting said first moving barrel and having a helicoid screw thread meshing with said helicoid screw thread of said focusing barrel, a second guide pin rigidly coupled thereto for transmitting movement of said first and third lens groups, a second guide groove extending parallel to said optical axis and into which is disposed said first guide pin for preventing rotational movement of said first moving barrel about said optical axis, a third guide groove extending perpendicular to said optical axis for defining the range of focusing for said lens and fourth and fifth guide grooves for defining the zooming range of said lens, said fourth guide groove extending perpendicular to said optical axis and said fifth guide groove extending from an end portion of said fourth guide groove parallel to said optical axis, said fifth guide groove being substantially shorter than said fourth guide groove; a mount barrel having a mount portion for attaching said zoom lens to a camera body, said mount barrel slidably supporting said second moving barrel, said mount barrel having a sixth guide groove extending parallel to said optical axis, said second guide pin being slidingly disposed in said sixth guide groove, said sixth guide groove preventing rotational movement of said second moving barrel around said optical axis and for guiding said second moving barrel in the direction of said optical axis, a seventh guide groove extending parallel to said optical axis, said first guide pin being slidingly disposed in said seventh guide groove; a cam sleeve slidingly supported by said mount barrel and having third and fourth guide pins rigidly coupled thereto, said cam sleeve having eighth through eleventh guide grooves formed therein, said eighth and ninth guide grooves imparting relative movement to said second and third lens groups, respectively, during zooming operations and said tenth and eleventh guide grooves imparting relative movement to said second and third lens groups, respectively, for close-up photographing operations, said eighth and tenth guide grooves being joined at end portions thereof, said eighth guide groove extending forwardly from its juncture with said tenth guide groove at a first predetermined angle with respect to said optical axis and said tenth guide groove extending forwardly from said juncture at a second predetermined angle with respect to said optical axis, said ninth and eleventh guide grooves being joined at end portions thereof, said ninth guide groove extending rearwardly of its juncture with said eleventh guide groove, and said eleventh guide being substantially perpendicular to said optical axis, said first guide pin being slidingly disposed to move along said eighth and tenth guide grooves and said second guide pin being slidingly disposed to move along said ninth and eleventh guide grooves; a guide ring sliding supported by said second moving barrel and having a fifth guide pin rigidly coupled thereto and slidingly disposed in said first guide groove and in said third guide groove barrel and said guide ring having a change-over groove formed at a position for conveying information as to when a change-over is possible for a change to a close-up photographing mode; a change-over sleeve slidingly supported by said second moving barrel and having a sixth guide pin fixedly coupled thereto and slidingly disposed to move in said fourth and fifth guide grooves, a twelfth guide groove extending parallel to said optical axis in which is slidingly disposed said third guide pin, first and second projections extending from said change-over sleeve, said first projection producing an indication for enabling said change-over from a zoom mode to said close-up mode and said second projection being disposed so as to indicate a position at which change-over from said close-up mode to said zooming mode is possible; a zooming sleeve having a thirteenth guide groove extending perpendicular to said optical axis with said fourth guide pin slidingly disposed therein wherein said zooming sleeve is rotatable integrally with said cam sleeve and said zooming sleeve being rotatably supported by said mount barrel and freely rotatable around said optical axis.

6. A zoom lens comprising: first, second and third lens groups; a focusing barrel supporting said first lens group and having a helicoid screw thread formed on an inner portion thereof and a first guide groove for transmitting angular movement of said focusing barrel during rotation thereof; a first moving barrel supporting said second lens group and having a first guide pin rigidly coupled thereto for transmitting movement of said second lens group; a second moving barrel supporting said third lens group and slidingly supported said first moving barrel and having a helicoid screw thread meshing with said helicoid screw thread of said focusing barrel, a second guide pin rigidly coupled thereto for transmitting movement of said first and third lens groups, a second guide groove extending parallel to said optical axis and into which is disposed said first guide pin for preventing rotational movement of said first moving barrel about said optical axis, a third guide groove extending perpendicular to said optical axis for defining the range of focusing for said lens and fourth and fifth guide grooves for defining the zooming range of said lens, said fourth guide groove extending perpendicular to said optical axis and said fifth groove extending from an end portion of said fourth guide groove parallel to said optical axis, said fifth guide groove being substantially shorter than said fourth guide groove; a mount barrel having a mount portion for attaching said zoom lens to a camera body, said mount barrel slidably supporting said second moving barrel, said mount barrel having a sixth guide groove extending parallel to said optical axis, said second guide pin being slidingly disposed in said sixth guide groove, said sixth guide groove preventing rotational movement of said second moving barrel around said optical axis and for guiding said second moving barrel in the direction of said optical axis, a seventh guide groove extending parallel to said optical axis, said first guide pin being slidingly disposed in said seventh guide groove; and said mount barrel having a screw thread, a cam sleeve slidingly supported by said mount barrel and having third and fourth guide pins rigidly coupled thereto, said cam sleeve having eighth through eleventh guide grooves formed therein, said eighth and ninth guide grooves imparting relative movement to said second and third lens groups, respectively, during zooming operations and said tenth and eleventh guide grooves imparting relative movement to said second and third lens groups, respectively, for close-up photographing operations, said eighth and tenth guide grooves being joined at end portions thereof, said eighth guide groove extending forwardly from its juncture with said tenth guide groove at a first predetermined angle with respect to said optical axis and said tenth guide groove extending forwardly from said juncture at a second predetermined angle with respect to said optical axis, said ninth and eleventh guide grooves being joined at end portions thereof, said ninth guide groove extending rearwardly of its juncture with said eleventh guide groove, and said eleventh guide being substantially perpendicular to said optical axis, said first guide pin being slidingly disposed to move along said eighth and tenth guide grooves and said second guide pin being slidingly disposed to move along said ninth and eleventh guide grooves; a guide ring sliding supported by said second moving barrel and having a guide pin rigidly coupled thereto and slidingly disposed in said first guide groove and in said third guide groove and said guide ring having a change-over groove formed at a position for conveying information as to when a change-over is possible for a change to a close-up photographing mode; a change-over sleeve slidingly supported by said second moving barrel and having a sixth guide pin fixedly coupled thereto and slidingly disposed to move in said fourth and fifth guide grooves, a twelfth guide groove extending parallel to said optical axis in which is slidingly disposed said third guide pin, first and second projections extending from said change-over sleeve, said first projection producing an indication for enabling said change-over from a zoom mode to said close-up mode and said second projection being disposed so as to indicate a position at which change-over from said close-up mode to said zooming mode is possible; a zooming operational barrel having a thirteenth guide groove extending perpendicular to said optical axis with said fourth guide pin slidingly disposed therein wherein said zooming operational barrel is rotatable integrally with said cam sleeve; and a ring member having a threaded groove engaged with said screw thread of said mount barrel, said ring member being formed to define movement of said cam sleeve in the direction of said optical axis, said zooming operational barrel and said ring member being coupled to move integrally with one another.

7. A zoom lens comprising: first and second lens groups; a focusing barrel supporting said first lens group and having a helicoid screw thread formed on an inner portion thereof and a first guide groove for transmitting angular movement of said focusing barrel during rotation thereof; a first moving barrel having a first guide pin rigidly coupled thereto and having a helicoid screw thread meshing with said helicoid screw thread of said focusing barrel; a second moving barrel supporting said second lens group and having a second guide pin rigidly coupled thereto for transmitting movement of said second lens group; a mount barrel having a mount portion for attaching said zoom lens to a camera body, said mount barrel slidably supporting said first and second moving barrels in inner portions thereof, said mount barrel having a second and third guide grooves extending parallel to the optical axis of said lens, said first guide pin being slidingly disposed in said third guide groove and said second guide pin being slidingly disposed in said second guide groove, a fourth guide groove formed in a rear portion thereof extending perpendicular to said optical axis, fifth guide groove for defining a focus range extending perpendicular to said optical axis in an outer coaxial portion of said mount barrel, sixth guide groove for defining a zoom range extending perpendicular to said optical axis in said outer coaxial portion, a seventh guide groove extending parallel to said optical axis from an end portion of said sixth guide groove; a zooming sleeve positioned around said fourth guide groove; a cam sleeve slidingly supported by said mount barrel and having third and fourth guide pins rigidly coupled thereto, said cam sleeve having eighth through eleventh guide grooves formed therein, said eighth and ninth guide grooves imparting relative movement to said first moving barrel and said second lens group, respectively, during zooming operations and said tenth and eleventh guide grooves imparting relative movement to said first moving barrel and said second lens group, respectively, for close-up photographing operations, said eighth and tenth guide grooves being joined at end portions thereof, said eighth guide groove extending forwardly from its juncture with said tenth guide groove at a first predetermined angle with respect to said optical axis and said tenth guide groove extending forwardly from said juncture at a second predetermined angle with respect to said optical axis, said ninth and eleventh guide grooves being joined at end portions thereof, said ninth guide groove extending rearwardly of its juncture with said eleventh guide groove, and said eleventh guide groove being substantially perpendicular to said optical axis, said first guide pin being slidingly disposed to move along said eighth and tenth guide grooves and said second guide pin being slidingly disposed to move along said ninth and eleventh guide grooves, said fourth guide pin being slidingly disposed in said fourth guide groove and being coupled to said zooming sleeve; a guide ring coaxially supported by said mount barrel and having a fifth guide pin rigidly coupled thereto and slidingly disposed in said fifth guide groove and said guide ring having a change-over groove formed at a position for conveying information as to when a change-over is possible for a change to a close-up photographing mode; and a change-over sleeve coaxially supported by said mount barrel and having a sixth guide pin fixedly coupled thereto and slidingly disposed to move in said sixth guide groove, an twelfth guide groove extending parallel to said optical axis in which is slidingly disposed said third guide pin, first and second projections extending from said change-over sleeve, said first projection producing an indication for enabling said change-over from a zoom mode to said close-up mode and said second projection being disposed so as to indicate a position at which change-over from said close-up mode to said zooming mode is possible.

8. A zoom lens comprising: first, second, third and fourth lens groups; a focusing barrel supporting said first lens groups and having a helicoid screw thread formed on an inner portion thereof and a first guide groove for transmitting angular movement of said focusing barrel during rotation thereof; a first moving barrel supporting said second lens group and having a first guide pin rigidly coupled thereto; a second moving barrel supporting said third lens group and having a second guide pin rigidly coupled thereto for transmitting movement of said third lens group; a mount barrel having a mount portion for attaching said zoom lens to a camera body, said mount barrel supporting said fourth lens group and slidingly supporting said first and second moving barrels in inner portions thereof, said mount barrel having a helicoid screw thread meshing with said screw thread of said focusing barrel and second and third guide grooves extending parallel to the optical axis of said lens, said first guide pin being slidingly disposed in said second guide groove, fourth guide groove formed in a rear portion thereof extending perpendicularly to said optical axis, fifth guide groove for defining a focus range extending perpendicular to said optical axis in an outer coaxial portion of said mount barrel, sixth guide groove for defining a zoom range extending perpendicular to said optical axis in said outer coaxial portion, seventh guide groove extending parallel to said optical axis from an end portion of said sixth guide groove; a zooming sleeve positioned around said third guide groove; a cam sleeve slidingly supported by said mount barrel and having third and fourth guide pins rigidly coupled thereto, said cam sleeve having eighth through eleventh guide grooves formed therein, said eighth and ninth guide grooves imparting relative movement to said first moving barrel and said second lens group, respectively, during zooming operations and said tenth and eleventh guide grooves imparting relative movement to said first moving barrel and said second lens group, respectively, for close-up photographing operations, said eighth and tenth guide grooves being joined at end portions thereof, said eighth guide groove extending forwardly from its juncture with said tenth guide groove at a first predetermined angle with respect to said optical axis and said tenth guide groove extending forwardly from said juncture at a second predetermined angle with respect to said optical axis, said ninth and eleventh guide grooves being joined at end portions thereof, said ninth guide groove extending rearwardly of its juncture with said eleventh guide groove, and said eleventh guide groove being substantially perpendicular to said optical axis, said first guide pin being slidingly disposed to move along said eighth and tenth guide grooves and said second guide pin being slidingly disposed to move along said eighth and tenth guide grooves, said fourth guide pin being slidingly disposed in said fourth guide groove and being coupled to said zooming sleeve; a guide ring coaxially supported by said mount barrel and having a fifth guide pin rigidly coupled thereto and slidingly disposed in said fifth guide groove and said guide ring having a change-over groove formed at a position for conveying information as to when a change-over is possible for a change to a close-up photographing mode; and a change-over sleeve coaxially supported by said mount barrel and having a sixth guide pin fixedly coupled thereto and slidingly disposed to move in said sixth guide groove, an a twelfth guide groove extending parallel to said optical axis in which is slidingly disposed said third guide pin, first and second projections extending from said change-over sleeve, said first projection producing an indication for enabling said change-over from a zoom mode to said close-up mode and said second projection being disposed so as to indicate a position at which change-over from said close-up mode to said zooming mode is possible.

* * * * *